United States Patent
Flender et al.

(10) Patent No.: US 9,982,705 B2
(45) Date of Patent: May 29, 2018

(54) ROLLER BEARING MOUNTED SHAFT

(71) Applicant: Mahle International GmbH, Stuttgart (DE)

(72) Inventors: Thomas Flender, Eberdingen (DE); Michael Kreisig, Stuttgart (DE); Antonio Menonna, Ditzingen (DE); Falk Schneider, Korntal-Muenchingen (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 0 days. days.

(21) Appl. No.: 14/341,290

(22) Filed: Jul. 25, 2014

(65) Prior Publication Data

US 2015/0027270 A1 Jan. 29, 2015

(30) Foreign Application Priority Data

Jul. 26, 2013 (DE) .................. 10 2013 214 680

(51) Int. Cl.
 *F16C 3/02* (2006.01)
 *F01L 1/047* (2006.01)

(52) U.S. Cl.
 CPC .............. *F16C 3/02* (2013.01); *F01L 1/047* (2013.01); *F01L 2001/0471* (2013.01); *F01L 2001/0475* (2013.01); *F01L 2001/0476* (2013.01); *Y10T 74/2101* (2015.01)

(58) Field of Classification Search
 CPC .... Y10T 74/2101; Y10T 74/2102; F16C 3/02; F16C 3/023; F01L 2001/0475; F01L 2001/0476; F01L 2001/0471; F16H 53/025
 See application file for complete search history.

(56) References Cited

U.S. PATENT DOCUMENTS

| | | | | |
|---|---|---|---|---|
| 3,869,938 A | * | 3/1975 | Schlotterbeck et al. | 74/567 |
| 4,556,532 A | * | 12/1985 | Umeha et al. | 419/5 |
| 4,597,365 A | * | 7/1986 | Madaffer | 123/90.6 |
| 4,781,076 A | * | 11/1988 | Hartnett et al. | 74/567 |
| 4,835,832 A | * | 6/1989 | Arnold et al. | 29/888.1 |
| 4,880,477 A | * | 11/1989 | Hayes et al. | 148/545 |
| 5,028,281 A | * | 7/1991 | Hayes et al. | 148/321 |
| 5,299,881 A | * | 4/1994 | Mettler-Friedli | 403/274 |
| 5,428,894 A | * | 7/1995 | Orsini, Jr. | 29/888.1 |

(Continued)

FOREIGN PATENT DOCUMENTS

| | | |
|---|---|---|
| DE | 19955386 A1 | 9/2000 |
| DE | 102010012505 A1 | 10/2010 |

(Continued)

OTHER PUBLICATIONS

AISI 5150 Steel. SAE Ferrous Material Standards Manual, 1999 ed., HS-30, Society of Automotive Engineers, Inc. (accessed on Jan. 2016 via knovel.com).*

(Continued)

*Primary Examiner* — Daniel D Yabut
(74) *Attorney, Agent, or Firm* — Fishman Stewart PLLC

(57) ABSTRACT

A roller-bearing mounted shaft may include a shaft tube having a shaft outer face with at least one rolling body running face. The shaft tube may have at least one functional element joined thermally thereto, wherein the shaft tube is formed as a welded and drawn tube and includes a carbon content of greater than 0.45 percent by mass.

12 Claims, 1 Drawing Sheet

(56) References Cited

U.S. PATENT DOCUMENTS

| | | | | |
|---|---|---|---|---|
| 5,826,461 | A | * | 10/1998 | Kaywood et al. .............. 74/567 |
| 6,006,429 | A | * | 12/1999 | Hanisch et al. ............. 29/888.1 |
| 6,153,030 | A | | 11/2000 | Hanisch et al. |
| 6,383,311 | B1 | | 5/2002 | Ochi et al. |
| 7,435,037 | B2 | * | 10/2008 | McKinzie, II ............ C07C 4/02 |
| | | | | 405/130 |
| 2008/0289592 | A1 | * | 11/2008 | Flender et al. .............. 123/90.6 |
| 2009/0139368 | A1 | * | 6/2009 | Mayer ............................ 74/567 |
| 2011/0136580 | A1 | | 6/2011 | Ooba et al. |

FOREIGN PATENT DOCUMENTS

| | | |
|---|---|---|
| DE | 102011011501 A1 | 8/2012 |
| EP | 1262671 A1 | 12/2002 |
| GB | 2345490 A | 7/2000 |
| JP | 2008-196013 A | 8/2008 |

OTHER PUBLICATIONS

AISI 8650 Steel. SAE Ferrous Material Standards Manual, 1999 ed., HS-30, Society of Automotive Engineers, Inc. (accessed on Jan. 2016 via knovel.com).*

Chen, Wai-Fah Lui, Eric M.. (2005). Handbook of Structural Engineering (2nd Edition)—4.1.8 Weldability of Steel. Taylor & Francis, pp. 4-7 to 4-8.*

English abstract for JP2008-196013.

English abstract for DE-102011011501.

English abstract for German Search Report for DE-102013214680.9, dated Mar. 19, 2014.

European Search Report for EP 14173882 dated Nov. 28, 2014.

English Abstract for DE 102010012505A1.

* cited by examiner

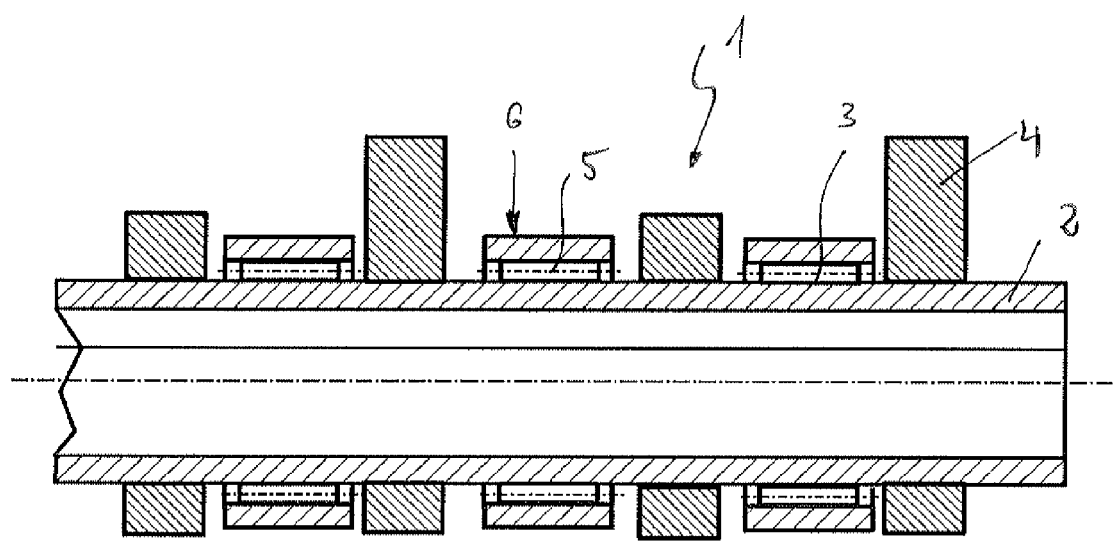

ROLLER BEARING MOUNTED SHAFT

CROSS-REFERENCE TO RELATED APPLICATIONS

This application claims priority to German Patent Application No. 10 2013 214 680.9 filed Jul. 26, 2013, the contents of which are hereby incorporated by reference in their entirety.

TECHNICAL FIELD

The present invention relates to a roller-bearing-mounted shaft having a shaft tube with a shaft outer face that is formed in some regions as a rolling body running face, according to the preamble of claim 1. The invention also relates to an internal combustion engine having such a roller-bearing-mounted shaft as a camshaft.

BACKGROUND

For built camshafts, welded and drawn tubes have usually been used so far, which have been mounted in the internal combustion engine by means of a corresponding sliding bearing. The use of welded and then drawn tubes was not possible until now for roller-bearing-mounted and built camshafts, since the rolling bodies of the roller bearing ran directly on a shaft outer face and until now it was only possible to achieve the necessary surface hardness values and wear resistance with seamlessly drawn tubes with a higher carbon content. In this case the shaft outer face that formed the rolling body running face had to be hardened, for which a carbon content of the material of the shaft tube of more than 0.45% by mass was absolutely necessary. However, it was not possible to weld tubes having such a high carbon content.

SUMMARY

The present invention is therefore concerned with the problem of specifying an improved embodiment for a roller-bearing-mounted shaft of the generic type, which in particular allows cost-effective and at the same time high-quality production of the shaft.

This problem is solved according to the invention by the subject matter of the independent claims. Advantageous embodiments form the subject matter of the dependent claims.

The invention is based on the general concept of now using a welded and then drawn shaft tube for a roller-bearing-mounted shaft having a shaft tube, which likewise has a carbon content of more than 0.45% by mass. This statement of course relates to the material of the shaft tube. It is now possible, using a novel manufacturing method, to produce such welded and drawn tubes with a high carbon content and use them for example for camshafts. A special high-frequency induction welding method is used to make this welding process possible. Compared to previous seamlessly drawn tubes, the tube welded and then drawn according to the invention offers the possibility of extremely economical and cost-effective manufacture along with a comparatively high carbon content. At the same time, the quality can also be increased, since the achievable diameter tolerances at the inner and outer diameters can be reduced. This produces for example the possibility of joining a plug to the shaft without additional machining of the inner diameter of the shaft. At the same time, better concentricity of the inner and outer diameters can also be produced, as a result of which fewer runouts of the joined plug and thus less oversize for subsequent machining are necessary. The bevels on the inner diameter that are necessary for guiding can also be made smaller as a result. It is furthermore particularly advantageous that less edge decarbonisation takes place owing to the room-temperature forming (drawing process) and so a smaller grinding oversize of the outer diameter is necessary. Owing to the smaller grinding allowance, a smaller hardness penetration depth is also necessary. The lower edge decarbonisation of the welded tube results in higher surface hardness.

In an advantageous development of the solution according to the invention, the shaft tube has a phosphorus content of less than 0.025% by volume. A sulphur content is also limited in the shaft tube according to the invention to less than 0.025% by volume. The limitation of both the sulphur content and the phosphorus content results in an increase in the vibration fatigue strength and the tolerable Hertzian stress.

In a further advantageous embodiment of the solution according to the invention, at least the region of the rolling body running faces are case-hardened, in particular induction-hardened. Induction hardening in particular makes it possible to heat partial regions, i.e. limited areas on the shaft outer surface of the shaft tube, to the necessary hardening temperature and then quench them. Furthermore, the entire cross section is not hardened (case hardening), so the toughness of the camshaft tube is retained. If the heat can flow fast enough into the rest of the still cold workpiece, i.e. into the rest of the still cold shaft, quenching can theoretically even be dispensed with altogether. With the partial hardening, which can also be carried out for example by laser hardening, high-quality and at the same time cost-effective hardening of the shaft is possible. The penetration depth in induction hardening depends on the frequency of the AC voltage. The higher the frequency of the voltage, the lower the penetration depth and thus the hardness penetration depth. The degree of heating can be influenced by means of the amperage and the duration of current supply. However, in order to keep the cycle times as short as possible and also to avoid hardening the workpiece all the way through, the duration of the current supply is comparatively short.

In an advantageous development of the solution according to the invention, a wall thickness of the shaft tube is to be provided of between 2 and 4 mm, in particular of less than 3 mm. Thinner wall thicknesses allow particularly lightweight camshaft designs.

The shaft is expediently formed as a camshaft or as a camshaft having an adjustable inner shaft or as a balance shaft. In the first case, the functional elements joined thermally thereto can for example be formed as cams, bearing rings, positioning aids or gearwheels, whereas in the second case they are usually formed as balancing weights. In particular, the use of the roller-bearing-mounted shaft as a camshaft offers the great advantage of being able to produce the latter in a cost-effective but extremely high-quality manner.

Further important features and advantages of the invention can be found in the subclaims, the drawing and the associated description of the FIGURE using the drawing.

It is self-evident that the above-mentioned features and those still to be explained below can be used not only in the combination given in each case but also in other combinations or alone without departing from the scope of the present invention.

BRIEF DESCRIPTION OF THE DRAWING

A preferred exemplary embodiment of the invention is shown in the drawing and is explained in the description below.

The single FIG. 1 shows a sectional diagram through a roller-bearing-mounted shaft according to the invention, which is formed as a camshaft.

DETAILED DESCRIPTION

According to FIG. 1, a roller-bearing-mounted shaft 1 according to the invention has a shaft tube 2 having a shaft outer face that is formed in some regions as a rolling body running face 3. In the present case, the shaft 1 is formed as a camshaft and has a plurality of cams 4 joined thermally thereto. Of course, other functional elements, such as bearings, positioning aids or gearwheels can also be joined thermally to the shaft tube 2 instead of the cams 4. For example, if the shaft 1 is formed as a balance shaft, functional elements formed as balancing weights are arranged thereon. According to the invention, the shaft tube 2 is then formed as a welded and then drawn tube and has a carbon content of >0.45% by mass. It is thereby possible to harden, in particular induction harden, the shaft tube 2 on its outer face, i.e. in the region of the rolling body running faces 3 and thereby allow direct, wear-free rolling of rolling bodies 5 on the rolling body running face 3 of the shaft tube 2 in the first place. For this use, a carbon content of >0.45% by mass is necessary, it being impossible to weld such tubes previously. However, it is now possible thanks to a novel manufacturing method to produce welded and drawn tubes having a carbon content of over 0.45% by mass and use them for example as camshafts. To this end, a high-frequency induction welding method is used.

The shaft 1 according to the invention offers the great advantage of economical and thus cost-effective manufacture in comparison with conventional shafts having a seamlessly drawn shaft tube. Furthermore, better diameter tolerances can be formed both on the outer diameter and on the inner diameter of the shaft tube 2. Owing to the much reduced manufacturing tolerances, it is also possible to join a plug in the inner diameter of the shaft tube 2 without additional machining. Furthermore, better concentricity of the inner diameter to the outer diameter of the shaft tube 2 can also be produced, producing fewer runouts of the joined plug. Owing to the reduced tolerances and the reduced edge decarbonisation, an oversize for subsequent machining, in particular what is known as a grinding allowance, can also be reduced. Bevels on the inner diameter of the shaft tube 2 that are necessary for guiding can also be made smaller.

In general, the shaft tube 2 has a phosphorus content and a sulphur content of <0.025% by mass. Such low phosphorus and sulphur contents increase the vibration fatigue strength and tolerable Hertzian stresses of the shaft tube.

At least the regions of the rolling body running faces 3 are case-hardened, for example induction-hardened, as described above and have a surface hardness of >58 HRC. Owing to the hardening of the rolling body running faces 3, direct, wear-free rolling of the rolling bodies 5, roller bearings 6 on the shaft outer face is possible, as a result of which the roller bearing 6 per se can be kept simple. A wall thickness of the shaft tube 2 is between 2 and 4 mm.

Of course, the shaft 1, in particular in if it is formed as a camshaft, can be joined in a module in a similar manner to a balance shaft, it of course also being conceivable for the camshaft to have fixed cams 4 and an inner shaft on the inside, which is connected to the cams mounted rotatably on the outer shaft, i.e. in the present case on the shaft tube 2.

The invention claimed is:

1. A roller-bearing-mounted shaft, comprising:
a shaft tube having a shaft outer face with at least one rolling body running face, the shaft tube having at least one receiving element joined thermally thereto;
wherein the shaft tube includes a cold-drawn steel material having a high-frequency inductively welded seam extending along a longitudinal axis of the shaft tube, and wherein the cold-drawn steel material of the shaft tube includes a carbon content of greater than 0.45% by mass, a phosphorus content of less than 0.025% by mass and a sulphur content of less than 0.025% by mass; and
wherein the at least one rolling body running face extends circumferentially about the shaft tube with respect to the longitudinal axis and transverse to the high-frequency inductively welded seam, and wherein the shaft outer face defining the at least one rolling body running face is case hardened via localized heat treatment.

2. The shaft according to claim 1, wherein the hardened rolling body running faces has a surface hardness of greater than 58 HRC.

3. The shaft according to claim 1, wherein the shaft tube includes a wall thickness between 2 mm and 4 mm.

4. The shaft according to claim 1, wherein the shaft tube is a camshaft.

5. The shaft according to claim 1, wherein the at least one receiving element is at least one of a cam, a bearing ring, a positioning aid, a gearwheel and a balancing weight.

6. The shaft according to claim 1, wherein the shaft tube is one of an outer shaft of an adjustable camshaft and a balance shaft.

7. The shaft according to claim 6, wherein the at least one rolling body running face has a surface hardness of greater than 58 HRC.

8. The shaft according to claim 1, wherein the at least one rolling body running face includes a wall thickness in a radial direction with respect to a longitudinal axis of the shaft tube, and wherein the at least one rolling body running face is case hardened in a radially outer portion of the wall thickness without heat modification to a radially inner portion of the wall thickness with respect to the longitudinal axis.

9. An internal combustion engine, comprising:
a shaft having a longitudinal axis and at least one rolling body running face extending circumferentially to the longitudinal axis on a shaft outer face, wherein the shaft is mounted via at least one roller bearing, the at least one roller bearing having at least one rolling body which rolls directly on the at least one rolling body running face of the shaft;
wherein the shaft is a high-frequency inductively welded tube of a cold-drawn steel material defining a longitudinally extending weld seam and a case-hardened outer surface extending along the at least one rolling body running face and transverse to the weld seam; and
wherein the cold-drawn steel material of the high-frequency inductively welded tube includes a carbon content of greater than 0.45 percent by mass, a phosphorus content less than 0.025% by mass and a sulphur content of less than 0.025% by mass.

10. The engine according to claim 9, wherein the case-hardened outer surface of the at least one rolling body running face has a surface hardness of greater than 58 HRC.

11. The engine according to claim 10, wherein the at least one rolling body running face includes a wall thickness in a radial direction with respect to a longitudinal axis of the shaft, and wherein the case-hardened outer surface of the at least one rolling body running face is on a radially outer portion of the wall thickness without heat modification to a radially inner portion of the wall thickness with respect to the longitudinal axis.

12. A roller-bearing-mounted shaft, comprising:
- a high-frequency inductively welded shaft tube of a cold-drawn steel material having a longitudinal axis and an outer face defining at least one rolling body running face configured to mount at least one roller bearing;
- wherein the high-frequency inductively welded shaft tube defines a weld seam extending along the longitudinal axis and the cold-drawn steel material includes a carbon content of greater than 0.45% by mass, a phosphorous content of less than 0.025% by mass and a sulphur content of less than 0.025% by mass; and
- wherein the at least one rolling body running face extends circumferentially about the high-frequency inductively welded shaft tube with respect to the longitudinal axis and transverse to the weld seam, and wherein the outer face defining the at least one rolling body running face is case hardened to include a localized surface hardness of greater than 58 HRC.

\* \* \* \* \*